(12) United States Patent
Kaita et al.

(10) Patent No.: US 9,346,907 B2
(45) Date of Patent: May 24, 2016

(54) METHOD FOR PRODUCING COPOLYMER

(71) Applicant: BRIDGESTONE CORPORATION, Tokyo (JP)

(72) Inventors: Shojiro Kaita, Tokyo (JP); Olivier Tardif, Saitama (JP); Yasuo Horikawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/471,673

(22) Filed: Aug. 28, 2014

(65) Prior Publication Data

US 2014/0371408 A1  Dec. 18, 2014

Related U.S. Application Data

(63) Continuation of application No. 13/389,214, filed as application No. PCT/JP2010/004847 on Jul. 30, 2010, now Pat. No. 8,853,339.

(30) Foreign Application Priority Data

Aug. 7, 2009 (JP) .................. 2009-184643

(51) Int. Cl.
| | |
|---|---|
| C08F 4/52 | (2006.01) |
| C08F 4/54 | (2006.01) |
| C08F 236/04 | (2006.01) |
| C08F 236/06 | (2006.01) |
| C08F 4/6592 | (2006.01) |
| C08F 210/02 | (2006.01) |
| C08F 4/659 | (2006.01) |

(52) U.S. Cl.
CPC ............... C08F 236/06 (2013.01); C08F 4/52 (2013.01); C08F 4/545 (2013.01); C08F 4/6592 (2013.01); C08F 210/02 (2013.01); C08F 236/04 (2013.01); C08F 4/65908 (2013.01); C08F 4/65912 (2013.01); Y10S 526/943 (2013.01)

(58) Field of Classification Search
CPC ...... C08F 4/545; C08F 136/04; C08F 136/06; C08F 4/52; C08F 236/04; C08F 136/062
See application file for complete search history.

(56) References Cited

U.S. PATENT DOCUMENTS

| 5,066,741 | A | 11/1991 | Campbell, Jr. |
| 2001/0018394 | A1 | 8/2001 | Brown |
| 2003/0004287 | A1 | 1/2003 | Barbotin et al. |
| 2007/0232758 | A1 | 10/2007 | Hou et al. |
| 2009/0264604 | A1 | 10/2009 | Kaita et al. |

FOREIGN PATENT DOCUMENTS

| CN | 101443343 A | 5/2009 |
| EP | 1 367 069 A1 | 12/2003 |
| EP | 2 017 280 A1 | 1/2009 |
| EP | 2 463 313 A1 | 6/2012 |
| EP | 2 599 805 A1 | 6/2013 |
| JP | 2003-532766 A | 11/2003 |
| JP | 2006-503141 A | 1/2006 |
| JP | 2007-063240 A | 3/2007 |
| JP | 2008-280384 A | 11/2008 |
| KR | 10-2009-0024144 A | 3/2009 |
| WO | 2007/129670 A1 | 11/2007 |
| WO | 2008/146643 A1 | 12/2008 |
| WO | 2009/148140 A1 | 12/2009 |

OTHER PUBLICATIONS

Office Action issued on Sep. 1, 2014 from the State Intellectual Property Office of P. R. China in corresponding Chinese Application No. 201080045171.6.
Chinese Office Action dated Dec. 4, 2012, issued in Chinese Patent Application No. 201080045171.6.
Communication dated Jul. 16, 2014 from the Saudi Arabian Patent Office in Saudi Arabian Patent Application No. 110310640.
Office Action dated Aug. 23, 2013 from the State Intellectual Property Office of P. R. China in a Chinese Application No. 201080045171.6.
Office Action issued on Jun. 4, 2013 from the Korean Patent Office in a Korean Application No. 10-2012-7005934.
Office Action mailed on Aug. 28, 2013 from the Korean Patent Office in Korean Application No. 10-2012-7005934.
Extended European Search Report dated Feb. 7, 2014 issued in European Application No. 10806210.0.
Office Action issued Mar. 7, 2014 by the Chinese Patent Office Action in Chinese Patent Application No. 201080045171.6.
Office Action issued Dec. 31, 2013 by the Saudi Arabia Patent Office in Saudi Arabia Patent Application No. 110310640.
Office Action dated Jul. 29, 2014 from the Japanese Patent Office in Japanese Patent Application No. 2011525777.
Communication dated Oct. 21, 2014 from the Japanese Patent Office in counterpart Japanese Application No. 2011-525777.
Japanese Office Action dated Oct. 6, 2015 from the Japanese Patent Office in corresponding Japanese Application No. 2014-256283.
Communication dated Dec. 15, 2015 from the Japanese Patent Office in corresponding Japanese Application No. 2014-256283.

*Primary Examiner* — Caixia Lu
(74) *Attorney, Agent, or Firm* — Sughrue Mion, PLLC

(57) ABSTRACT

This invention relates to a method for producing a copolymer of a conjugated diene compound and an unconjugated olefin other than the conjugated diene compound having a high cis-1,4 bond content of a conjugated diene compound portion, and more particularly to a method for producing a copolymer characterized by comprising a step of polymerizing a conjugated diene compound and an unconjugated olefin other than the conjugated diene compound in the presence of a polymerization catalyst composition including at least one complex selected from a metallocene complex represented by the following general formula (I):

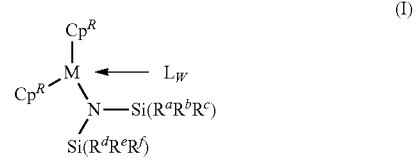

(I)

(wherein M is a lanthanoid element, scandium or yttrium, and $Cp^R$ is independently a non-substituted or substituted indenyl, and $R^a$-$R^f$ are independently an alkyl group having a carbon number of 1-3 or a hydrogen atom, and L is a neutral Lewis base, and w is an integer of 0-3) and so on.

8 Claims, 4 Drawing Sheets

METHOD FOR PRODUCING COPOLYMER

CROSS REFERENCE TO RELATED APPLICATIONS

This application is a continuation of U.S. application Ser. No. 13/389,214, filed Apr. 18, 2012, which is a National Stage of International Application No. PCT/JP2010/004847 filed Jul. 30, 2010, claiming priority based on Japanese Patent Application No. 2009-184643, filed Aug. 7, 2009, the contents of all of which are incorporated herein by reference in their entirety.

TECHNICAL FIELD

This invention relates to a method for producing a copolymer, and more particularly to a method for producing a copolymer of a conjugated diene compound and an unconjugated olefin other than the conjugated diene compound having a high cis-1,4 bond content in the conjugated diene compound portion.

BACKGROUND ART

In a coordinating anion polymerization using a catalyst system as typified by a Ziegler-Natta catalyst, it is well known that olefin or diene can be homopolymerized. In such a catalyst system, however, it is difficult to copolymerize olefin and diene efficiently. For example, JP-A-2006-503141 (Patent Document 1) describes the copolymerization of olefin and diene, but there are problems in a method as described in Patent Document 1 that the resulting polymer has the restrictive structure, and a catalytic activity is low, and the molecular weight of the polymer is low, and so on.

PRIOR ART DOCUMENT

Patent Document

Patent Document 1: JP-A-2006-503141

SUMMARY OF THE INVENTION

Problems to be Solved by the Invention

It is, therefore, an object of the invention to provide a method for producing a copolymer of a conjugated diene compound and an unconjugated olefin other than the conjugated diene compound, which has a high cis-1,4 bond content in the conjugated diene compound portion, with a novel metallocene complex.

Means for Solving the Problem

The inventors have made various studies in order to achieve the above object and discovered that a conjugated diene compound and an unconjugated olefin other than the conjugated diene compound are polymerized in the presence of a polymerization catalyst composition including a specified metallocene complex to obtain a copolymer comprised of these monomers, and as a result the invention has been accomplished.

That is, the method for producing the copolymer according to the invention is characterized by comprising a step of polymerizing a conjugated diene compound and an unconjugated olefin other than the conjugated diene compound in the presence of a polymerization catalyst composition including at least one complex selected from the group consisting of a metallocene complex represented by the following general formula (I):

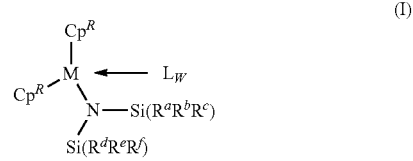

(wherein M is a lanthanoid element, scandium or yttrium, and $Cp^R$ is independently a non-substituted or substituted indenyl, and $R^a$-$R^f$ are independently an alkyl group having a carbon number of 1-3 or a hydrogen atom, and L is a neutral Lewis base, and w is an integer of 0-3), a metallocene complex represented by the following general formula (II):

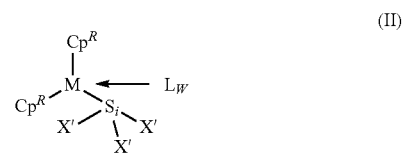

(wherein M is a lanthanoid element, scandium or yttrium, and $Cp^R$ is independently a non-substituted or substituted indenyl, and X' is a hydrogen atom, a halogen atom, an alkoxide group, a thiolate group, an amide group, a silyl group or a hydrocarbon group having a carbon number of 1-20, and L is a neutral Lewis base, and w is an integer of 0-3) and a half-metallocene cation complex represented by the following general formula (III):

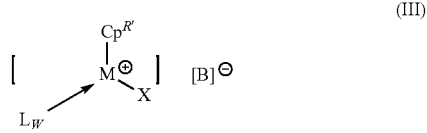

(wherein M is a lanthanoid element, scandium or yttrium, and $Cp^{R'}$ is a non-substituted or substituted cyclopentadienyl, indenyl or fluorenyl, and X is a hydrogen atom, a halogen atom, an alkoxide group, a thiolate group, an amide group, a silyl group or a hydrocarbon group having a carbon number of 1-20, and L is a neutral Lewis base, and w is an integer of 0-3, and [B]$^-$ is a non-coordinating anion).

The metallocene complex is a complex compound wherein one or more cyclopentadienyls or a derivative thereof is bonded to a center metal. Particularly, a metallocene complex having one cyclopentadienyl or a derivative thereof bonded to the center metal may be referred to as a half-metallocene complex. Also, olefin is an aliphatic unsaturated hydrocarbon, which is a compound having one or more carbon-carbon double bonds.

In a preferable embodiment of the method for producing the copolymer according to the invention, at least one of the $R^a$-$R^f$ is a hydrogen atom.

In another preferable embodiment of the method for producing the copolymer according to the invention, at least one of the $R^a$-$R^c$ is a hydrogen atom and at least one of the $R^d$-$R^f$ is a hydrogen atom.

In the other preferable embodiment of the method for producing the copolymer according to the invention, the polymerization of the conjugated diene compound and the unconjugated olefin other than the conjugated diene compound is an addition polymerization.

In a further preferable embodiment of the method for producing the copolymer according to the invention, the unconjugated olefin other than the conjugated diene compound is an acyclic olefin. In a still further preferable embodiment of the method for producing the copolymer according to the invention, the unconjugated olefin other than the conjugated diene compound is an α-olefin having a carbon number of 2-10. At this moment, as the unconjugated olefin other than the conjugated diene compound are preferable ethylene and propylene.

In another preferable embodiment of the method for producing the copolymer according to the invention, the conjugated diene compound has a carbon number of 4-8. At this moment, as the conjugated diene compound are preferable 1,3-butadiene and isoprene.

In the other preferable embodiment of the method for producing the copolymer according to the invention, when the conjugated diene compound is polymerized with the unconjugated olefin, a pressure of the unconjugated olefin is 0.1 MPa to 10 MPa.

In a further preferable embodiment of the method for producing the copolymer according to the invention, when the conjugated diene compound is polymerized with the unconjugated olefin, a concentration of the conjugated diene compound (mol/l) and a concentration of the unconjugated olefin (mol/l) at the starting of the polymerization satisfy a relation of the following equation:

concentration of unconjugated olefin/concentration of conjugated diene compound≥1.0.

Effects of the Invention

According to the invention, the conjugated diene compound and the unconjugated olefin other than the conjugated diene compound are polymerized in the presence of the polymerization catalyst composition including the specified metallocene complex, whereby a copolymer having a high cis-1,4 bond content in the conjugated diene compound portion can be produced.

MODE FOR CARRYING OUT THE INVENTION

Figure 1:
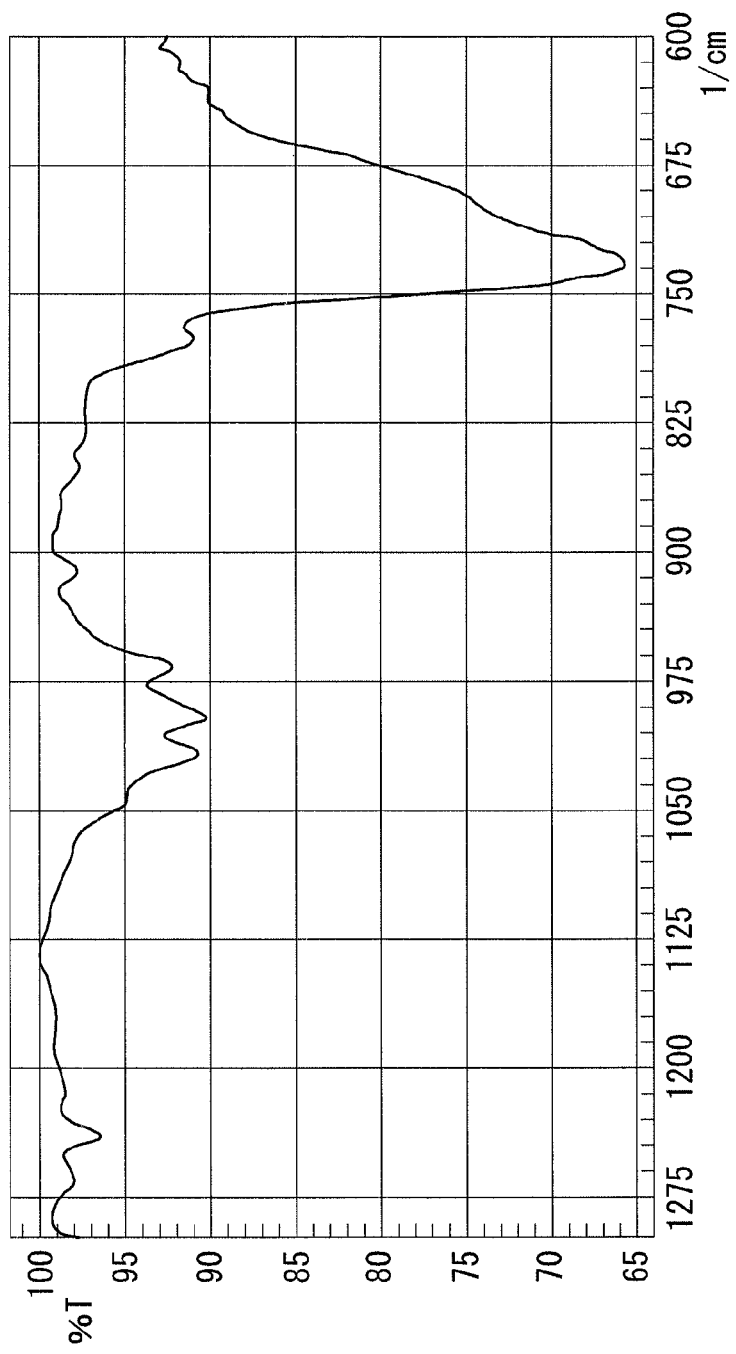
FIG. 1 is a chart of an IR spectrum of a butadiene-ethylene copolymer B.

The invention will be described in detail below. The method for producing the copolymer according to the invention is characterized by comprising a step of polymerizing a conjugated diene compound and an unconjugated olefin other than the conjugated dienc compound in the presence of a polymerization catalyst composition including at least one complex selected from the group consisting of metallocene complexes represented by the above general formulae (I) and (II), and the half-metallocene cation complex represented by the above general formula (III). As mentioned above, it is difficult to copolymerize olefin and diene efficiently in the conventional coordinating polymerization catalyst. The inventors have found that by optimizing a center metal used in a main catalyst and a ligand of the center metal in a catalyst system used in a coordinating anion polymerization can be efficiently introduced the unconjugated olefin other than the conjugated diene compound in the polymerization reaction of the conjugated diene compound. Also, the copolymer of the conjugated diene compound and the unconjugated olefin other than the conjugated diene compound obtained by using such a catalyst system have a high cis-1,4 bond content in the microstructure of the conjugated diene compound portion. Therefore, the copolymer obtained by the production method according to the invention is high in the extension crystallinity of the conjugated diene compound portion and maintains a glass transition point (Tg) at a low state, so that it is capable of improving a wear resistance and is preferably used as a rubber component of a rubber composition.

The copolymer of the conjugated diene compound and the unconjugated olefin other than the conjugated diene compound, which is obtained by the method for producing the copolymer according to the invention, is not particularly limited except for using a polymerization catalyst composition described in detail later, and may be obtained, for example, by copolymerizing a mixture of a conjugated diene compound and an unconjugated olefin other than the conjugated diene compound as a monomer likewise the method for producing a polymer with the usual coordinating ion polymerization catalyst. Also, in the method for producing the copolymer according to the invention, the polymerization of the conjugated diene compound and the unconjugated olefin other than the conjugated diene compound is preferably an addition polymerization. Further, in the method for producing the copolymer according to the invention, the polymerization of the conjugated diene compound and the unconjugated olefin other than the conjugated diene compound is preferably a random copolymerization. As the polymerization method can be used any methods such as solution polymerization method, suspension polymerization method, liquid-phase bulk polymerization method, emulsion polymerization method, vapor-phase polymerization method, solid-phase polymerization method and the like. When a solvent is used in the polymerization reaction, it is sufficient that the solvent used is inactive in the polymerization reaction, and the amount of the solvent used is optional, but is preferable to be an amount that the concentration of the complex included in the polymerization catalyst composition is rendered into 0.1-0.0001 mol/l.

The conjugated diene compound used as the monomer preferably has a carbon number of 4-8. As the conjugated diene compound are concretely mentioned 1,3-butadiene, isoprene, 1,3-pentadiene, 2,3-dimethylbutadiene and the like. Among them, 1,3-butadiene and isoprene are preferable. These conjugated diene compounds may be used alone or in a combination of two or more.

On the other hand, the unconjugated olefin used as the monomer is an unconjugated olefin other than the conjugated diene compound, which has an excellent heat resistance and is possible to enhance a degree of design freedom as an elastomer by decreasing a proportion of double bonds occupied in the main chain of the copolymer but also controlling a crystallizability. As the unconjugated olefin is preferable an acyclic olefin, and also an α-olefin having a carbon number of 2-10 is preferable as the unconjugated olefin. Since α-olefin has a double bond in the α-position of olefin, the copolymerization with the conjugated diene compound can be conducted efficiently. Therefore, as the unconjugated olefin are preferably mentioned α-olefins such as ethylene, propylene, 1-butene, 1-pentene, 1-hexene, 1-heptene, 1-octene and the like. Among them, ethylene, propylene and 1-butene are preferable. These unconjugated olefins may be used alone or in a combination of two or more.

The polymerization catalyst composition used in the method for producing the copolymer according to the invention is required to comprise at least one complex selected from the group consisting of the metallocene complexes represented by the general formulae (I) and (II) and the half-metallocene cation complex represented by the general formula (III) and further is preferable to include other component contained in the polymerization catalyst composition comprising the usual metallocene complex, for example, a co-catalyst or the like.

In the metallocene complexes represented by the general formulae (I) and (II), $Cp^R$ is a non-substituted indenyl or a substituted indenyl. $Cp^R$ having an indenyl ring as a basic skeleton may be shown by $C_9H_{7-x}R_x$ or $C_9H_{11-x}R_x$, wherein x is an integer of 0-7 or 0-11. Also, R is preferable to be independently a hydrocarbyl group or a metalloid group. The carbon number of the hydrocarbyl group is preferably 1-20, more preferably 1-10, most preferably 1-8. Concretely, as the hydrocarbyl group are preferably mentioned methyl group, ethyl group, phenyl group, benzyl group and the like. On the other hand, as an example of metalloid in the metalloid group are mentioned Ge of germyl, Sn of stannyl and Si of silyl, and the metalloind group is preferable to have a hydrocarbyl group, and the hydrocarbyl group included in the metalloid group is the same as in the above-mentioned hydrocarbyl group. As the metalloid group are concretely mentioned trimethyl silyl group and so on. As the substituted indenyl are concretely mentioned 2-phenylindenyl, 2-methylindenyl and the like. Moreover, the two $Cp^R$s in the general formulae (I) and (II) may be same or different with each other.

In the half-metallocene complex represented by the general formula (III), $Cp^{R'}$ is a non-substituted or substituted cyclopentadienyl, indenyl or fluorenyl, among which the non-substituted or substituted indenyl is preferable. $Cp^{R'}$ having cyclopentadienyl ring as a basic skeleton is shown by $C_5H_{5-x}R_x$. In this case, x is an integer of 0-5. Also, R is preferable to be independently a hydrocarbyl group or a metalloid group. The carbon number of the hydrocarbyl group is preferably 1-20, more preferably 1-10, most preferably 1-8. Concretely, as the hydrocarbyl group are preferably mentioned methyl group, ethyl group, phenyl group, benzyl group and the like. On the other hand, as an example of metalloid in the metalloid group are mentioned Ge of germyl, Sn of stannyl and Si of silyl, and the metalloid group is preferable to have a hydrocarbyl group, and the hydrocarbyl group included in the metalloid group is the same as in the above-mentioned hydrocarbyl group. As the metalloid group are concretely mentioned trimethyl silyl group and so on. As $Cp^{R'}$ having cyclopentadienyl ring as a basic skeleton are concretely exemplified the followings:

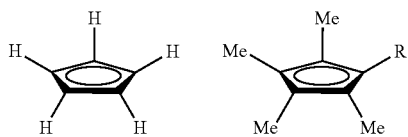

(wherein R is a hydrogen atom, methyl group or ethyl group.)

In the general formula (III), $Cp^{R'}$ having indenyl ring as a basic skeleton is defined in the same manner as in $Cp^R$ of the general formula (I) and also a preferable example thereof is same.

In the general formula (III), $Cp^{R'}$ having fluorenyl ring as a basic skeleton may be shown by $C_{13}H_{9-x}R_x$ or $C_{13}H_{17-x}R_x$. In this case, x is an integer of 0-9 or 0-17. Also, R is preferable to be independently a hydrocarbyl group or a metalloid group. The carbon number of the hydrocarbyl group is preferably 1-20, more preferably 1-10, most preferably 1-8. Concretely, as the hydrocarbyl group are preferably mentioned methyl group, ethyl group, phenyl group, benzyl group and the like. On the other hand, as an example of metalloid in the metalloid group are mentioned Ge of germyl, Sn of stannyl and Si of silyl, and the metalloid group is preferable to have a hydrocarbyl group, and the hydrocarbyl group included in the metalloid group is the same as in the above-mentioned hydrocarbyl group. As the metalloid group are concretely mentioned trimethyl silyl group and so on.

The center metal M in the general formulae (I), (II) and (III) is a lanthanoid element, scandium or yttrium. In the lanthanoid element are included fifteen elements of Atomic Numbers 57-71, any one of which may be used. As the center metal M are preferably mentioned samarium Sm, neodymium Nd, praseodymium Pr, gadolinium Gd, cerium Ce, holmium Ho, scandium Sc and yttrium Y.

The metallocene complex represented by the general formula (I) includes a silylamide ligand [—$N(SiR_3)_2$]. Each of R groups ($R^a$-$R^f$ in the formula (I)) included in the silylamide ligand is independently an alkyl group having a carbon number of 1-3 or a hydrogen atom. Also, at least one of $R^a$-$R^f$ is preferably a hydrogen atom. When at least one of $R^a$-$R^f$ is made a hydrogen atom, the synthesis of the catalyst becomes easier, and the bulkiness around silicon becomes lower, and hence the unconjugated olefin is introduced easily. From the same viewpoint, it is more preferable that at least one of $R^a$-$R^c$ is a hydrogen atom and at least one of $R^d$-$R^f$ is a hydrogen atom. Moreover, as an alkyl group is preferable methyl group.

The metallocene complex represented by the general formula (II) includes a silyl ligand [—$SiX'_3$]. X' included in the silyl ligand [—$SiX'_3$] is a group defined likewise X of the general formula (III) described later, and also a preferable group is same.

In the general formula (III), X is a group selected from the group consisting of a hydrogen atom, a halogen atom, an alkoxide group, a thiolate group, an amide group, a silyl group and a hydrocarbon group having a carbon number of 1-20. As the alkoxide group are mentioned aliphatic alkoxy groups such as methoxy group, ethoxy group, propoxy group, n-butoxy group, isobutoxy group, sec-butoxy group, tert-butoxy group and the like; and aryloxide groups such as phenoxy group, 2,6-di-tert-butylphenoxy group, 2,6-diisopropylphenoxy group, 2,6-dineopentylphenoxy group, 2-tert-butyl-6-isopropylphenoxy group, 2-tert-butyl-6-neopentylphenoxy group, 2-isopropyl-6-neopentylphenoxy group and the like, and among them 2,6-di-tert-butylphenoxy group is preferable.

As the thiolate group shown by X in the general formula (III) are mentioned aliphatic thiolate groups such as thiomethoxy group, thioethoxy group, thiopropoxy group, thio-n-butoxy group, thioisobutoxy group, thio-sec-butoxy group, thio-tert-butoxy group and the like; arylthiolate groups such as thiophenoxy group, 2,6-di-tert-butylthiophenoxy group, 2,6-diisopropylthiophenoxy group, 2,6-dineopentylthiophenoxy group, 2-tert-butyl-6-isopropylthiophenoxy group, 2-tert-butyl-6-thioneopentylphenoxy group, 2-isopropyl-6-thioneopentylphenoxy group, 2,4,6-triisopropylthiophenoxy group and the like, and among them 2,4,6-triisopropylthiophenoxy group is preferable.

As the amide group shown by X in the general formula (III) are mentioned aliphatic amide groups such as dimethylamide group, diethylamide group, diisopropylamide group and the like; arylamide groups such as phenylamide group, 2,6-di-tert-butylphenylamide group, 2,6-diisopropylphenylamide group, 2,6-dineopentylphenylamide group, 2-tert-butyl-6-isopropylphenylamide group, 2-tert-butyl-6-neopentylphenylamide group, 2-isopropyl-6-neopentylphenylamide group, 2,4,6-tert-butylphenylamide group and the like; and bistrialkylsilylamide groups such as bistrimethylsilylamide group and the like, and among them bistrimethylsilylamide group is preferable.

As the silyl group shown by X in the general formula (III) are mentioned trimethylsilyl group, tris(trimethylsilyl)silyl group, bis(trimethylsilyl)methylsilyl group, trimethylsilyl (dimethyl)silyl group, triisopropylsilyl(bistrimethylsilyl)silyl group and the like, and among them tris(trimethylsilyl) silyl group is preferable.

As the halogen atom shown by X in the general formula (III) may be fluorine atom, chlorine atom, bromine atom or iodine atom, and the chlorine atom or bromine atom is preferable. As the hydrocarbon group having a carbon number of 1-20 shown by X are concretely mentioned straight or branched aliphatic hydrocarbon groups such as methyl group, ethyl group, n-propyl group, isopropyl group, n-butyl group, isobutyl group, sec-butyl group, tert-butyl group, neopentyl group, hexyl group, octyl group and the like; aromatic hydrocarbon groups such as phenyl group, tolyl group, naphthyl group and the like; an aralkyl group such as benzyl group or the like; a hydrocarbon group containing silicon atom such as trimethylsilylmethyl group, bistrimethylsilylmethyl group or the like, and so on, and among them methyl group, ethyl group, isobutyl group and trimethylsilylmethyl group and so on are preferable.

As X in the general formula (III) is preferable bistrimethylsilylamide group or a hydrocarbon group having a carbon number of 1-20.

As the non-coordinating anion shown by [B]⁻ in the general formula (III) is mentioned, for example, a tetravalent boron anion. As the tetravalent boron anion are concretely mentioned tetraphenylborate, tetrakis(monofluorophenyl) borate, tetrakis(difluorophenyl)borate, tetrakis(trifluororphenyl)borate, tetrakis(tetrafluorophenyl)borate, tetrakis(pentafluorophenyl)borate, tetrakis(tetrafluoromethylphenyl) borate, tetra(tolyl)borate, tetra(xylyl)borate, (triphenyl, pentafluorophenyl)borate, [tris(pentafluorophenyl), phenyl] borate, tridecahydride-7,8-dicarbaundecaborate and the like, and among them tetrakis(pentafluorophenyl)borate is preferable.

The metallocene complexes represented by the general formulae (I) and (II) as well as the half-metallocene cation complex represented by the general formula (III) contain further 0-3, preferably 0-1 neutral Lewis base L. As the neutral Lewis base L are mentioned, for example, tetrahydrofuran, diethyl ether, dimethyl aniline, trimethyl phosphine, lithium chloride, neutral olefins, neutral diolefins and so on. At this moment, when the complex contains a plurality of neutral Lewis bases L, the neutral Lewis bases L may be same or different.

Also, the metallocene complexes represented by the general formulae (I) and (II) as well as the half-metallocene cation complex represented by the general formula (III) may be present as a monomer or may be present as a dimer or more.

The metallocene complex represented by the general formula (I) can be obtained, for example, by reacting a lanthanoid trishalide, scandium trishalide or yttrium trishalide with a salt (e.g. potassium salt or lithium salt) of indenyl and a salt (e.g. potassium salt or lithium salt) of bis(trialkylsilyl)amide in a solvent. Moreover, the reaction temperature is sufficient to be about room temperature, so that the complex can be produced under moderate conditions. Also, the reaction time is optional but is about several hours to few ten hours. The reaction solvent is not particularly limited, but is preferable to be a solvent dissolving a raw material and a product, and toluene may be used, for example. An example of the reaction for obtaining the metallocene complex represented by the general formula (I) is shown below:

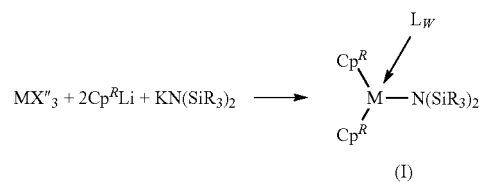

(wherein X" is a halide.)

The metallocene complex represented by the general formula (II) can be obtained, for example, by reacting a lanthanoid trishalide, scandium trishalide or yttrium trishalide with a salt (e.g. potassium salt or lithium salt) of indenyl and a salt (e.g. potassium salt or lithium salt) of silyl in a solvent. Moreover, the reaction temperature is sufficient to be about room temperature, so that the complex can be produced under moderate conditions. Also, the reaction time is optional but is about several hours to few ten hours. The reaction solvent is not particularly limited, but is preferable to be a solvent dissolving a raw material and a product, and toluene may be used, for example. An example of the reaction for obtaining the metallocene complex represented by the general formula (II) is shown below:

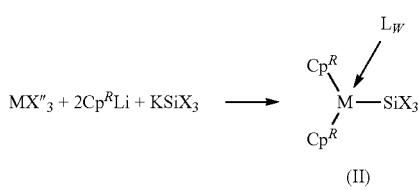

(wherein X" is a halide.)

The half-metallocene cation complex represented by the general formula (III) can be obtained, for example, by the following reaction.

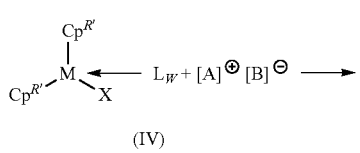

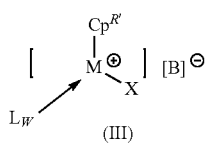

$$\left[ \begin{array}{c} Cp^{R'} \\ | \\ M^\oplus \diagdown X \\ \diagup \\ L_W \end{array} \right] [B]^\ominus \quad (III)$$

In the compound represented by the general formula (IV), M is a lanthanoid element, scandium or yttrium, and $Cp^{R'}$ is independently a non-substituted or substituted cyclopentadienyl, indenyl or fluorenyl, and X is a hydrogen atom, a halogen atom, an alkoxide group, a thiolate group, an amide group, a silyl group or a hydrocarbon group having a carbon number of 1-20, and L is a neutral Lewis base, and w is an integer of 0-3. In an ionic compound represented by a general formula $[A]^+[B]^-$, $[A]^+$ is a cation and $[B]^-$ is a non-coordinating anion.

As the cation shown by $[A]^+$ are mentioned, for example, carbonium cation, oxonium cation, amine cation, phosphonium cation, cycloheptatrienyl cation, ferrocenium cation containing a transition metal and so on. As the carbonium cation are mentioned trisubstituted carbonium cation such as triphenylcarbonium cation, tri(substituted phenyl)carbonium cation or the like, and so on. As the tri(substituted phenyl) carbonium cation are concretely mentioned tri(methylphenyl)carbonium cation and the like. As the amine cation are mentioned trialkyl ammonium cation such as trimethyl ammonium cation, triethyl ammonium cation, tripropyl ammonium cation, tributyl ammonium cation or the like; N,N-dialkyl anilinium cation such as N,N-dimethyl anilinium cation, N,N-diethyl anilinium cation, N,N-2,4,6-pentamethyl anilinium cation or the like; dialkyl ammonium cation such as diisopropyl ammonium cation, dicyclohexyl ammonium cation or the like; and so on. As the phosphonium cation are mentioned triaryl phosphonium cation such as triphenyl phosphonium cation, tri(methylphenyl)phosphonium cation, tri(dimethylphenyl)phosphonium cation or the like; and so on. Among these cations, N,N-dialkyl anilinium cation or carbonium cation is preferable, and N,N-dialkyl anilinium cation is particularly preferable.

The ionic compound of the general formula $[A]^+[B]^-$ used in the above reaction is a compound composed of a combination of the selected non-coordinating anion and cation and is preferably N,N-dimethylanilinium tetrakis(pentafluorophenyl)borate, triphenylcarbonium tetrakis(pentafluorophenyl)borate or the like. Further, the ionic compound of the general formula $[A]^+[B]^-$ is added to the metallocene complex in a molar amount of preferably 0.1-10 times, more preferably about 1 times. Moreover, when the half-metallocene cation complex represented by the general formula (III) is used in the polymerization reaction, the half-metallocene cation complex represented by the general formula (III) may be provided to the polymerization reaction system as it is, or the compound of the general formula (IV) and the ionic compound of the general formula $[A]^+[B]^-$ used in the above reaction may be provided separately to the polymerization reaction system to form the half-metallocene cation complex of the general formula (III) in the reaction system. Also, by using a combination of the metallocene complex of the general formula (I) or (II) and the ionic compound of the general formula $[A]^+[B]^-$ may be formed the half-metallocene cation complex of the general formula (III) in the reaction system.

It is preferable to determine the structures of the metallocene complexes represented by the general formulae (I) and (II) and the half-metallocene cation complex represented by the general formula (III) through an X-ray structure analysis.

A promoter usable in the polymerization catalyst composition may be optionally selected from components used as a promoter in the polymerization catalyst composition containing the usual metallocene complex. As the promoter are preferably mentioned, for example, aluminoxane, an organoaluminum compound, the aforementioned ionic compounds and the like. These promoters may be used alone or in a combination of two or more.

As the aluminoxane is preferable an alkylaluminoxane, which includes, for example, methylaluminoxane (MAO), a modified methylaluminoxane and the like. As the modified methylaluminoxane are preferable MMAO-3A (made by Toso Finechem Co., Ltd.) and the like. Moreover, the content of aluminoxane in the polymerization catalyst composition is preferable so that a element ratio Al/M of aluminum element Al in the aluminoxane to the center metal M in the metallocene complex is about 10-1000, preferably about 100.

As the organoaluminum compound is preferable an organic aluminum compound represented by the general formula: AlRR'R" (wherein R and R' are independently $C_1$-$C_{10}$ hydrocarbon group or a hydrogen atom, and R" is $C_1$-$C_{10}$ hydrocarbon group). As the concrete example of the organoaluminum compound are mentioned, for example, a trialkylaluminum, a dialkylaluminum chloride, an alkylaluminum dichloride, a dialkylaluminum hydride and the like. Among them, the trialkylaluminum is preferable. As the trialkylaluminum are mentioned, for example, triethylaluminum, triisobutylaluminum and the like. Moreover, the content of the organoaluminum compound in the polymerization catalyst composition is preferably 1-50 times, more preferably about 10 times per 1 mol of the metallocene complex.

In the polymerization catalyst composition, each of the metallocene complexes of the general formulae (I) and (II) as well as the half-metallocene cation complex of the general formula (III) is combined with an adequate promoter, whereby the content of cis-1,4 bond or the molecular weight of the resulting copolymer can be increased.

The method for producing the copolymer according to the invention may be conducted in the same manner as in a method for polymerizing a polymer through polymerization reaction using the conventional coordinating ion polymerization catalyst except for using the aforementioned polymerization catalyst composition as a polymerization catalyst, as mentioned above In the method for producing the copolymer according to the invention, for example, (1) components constituting the polymerization catalyst composition may be separately supplied to a polymerization reaction system containing the conjugated diene compound and unconjugated olefin other than the conjugated diene compound as a monomer to form the polymerization catalyst composition in such a reaction system, or (2) the previously prepared polymerization catalyst composition may be supplied to the polymerization reaction system. Also, the item (2) includes the provision of a metallocene complex activated by the promoter (active species). Moreover, the amount of the metallocene complex included in the polymerization catalyst composition used is preferable to be a range of 0.0001-0.01 times more than the mole in total of the conjugated diene compound and unconjugated olefin other than the conjugated diene compound.

Moreover, it is preferable to conduct the polymerization reaction in an atmosphere of an inert gas, preferably nitrogen gas or argon gas.

The polymerization temperature in the above polymerization reaction is not particularly limited, but is preferably a range of, for example, −100° C. to 200° C. and may also be about room temperature. If the polymerization temperature is raised, cis-1,4 selectivity in the polymerization reaction may be lowered. On the other hand, the reaction time in the polymerization reaction is not particularly limited and is preferably a range of, for example, 1 second to 10 days, but may be properly selected in accordance with a kind of a monomer to be polymerized, a kind of a catalyst, and conditions such as polymerization temperature and the like.

In the method for producing the copolymer according to the invention, when the conjugated diene compound is polymerized with the unconjugated olefin other than the conjugated diene compound, the pressure of the unconjugated olefin is preferably 0.1 MPa to 10 MPa. When the pressure of the unconjugated olefin is not less than 0.1 MPa, the unconjugated olefin can be efficiently introduced into the reaction mixture. While when the pressure of the unconjugated olefin is too high, the effect of efficiently introducing the unconjugated olefin is saturated, so that the pressure of the unconjugated olefin is preferably not more than 10 MPa.

In the method for producing the copolymer according to the invention, when the conjugated diene compound is polymerized with the unconjugated olefin other than the conjugated diene compound, the concentration of the conjugated diene compound (mol/l) and the concentration of the unconjugated olefin (mol/l) at the starting of the polymerization are preferable to satisfy the relation of the following equation:

concentration of unconjugated olefin/concentration of conjugated diene compound≥1.0, more preferably the relation of the following equation:

concentration of unconjugated olefin/concentration of conjugated diene compound≥1.3, most preferably the relation of the following equation:

concentration of unconjugated olefin/concentration of conjugated diene compound≥1.7.

By rendering the value of concentration of unconjugated olefin/concentration of conjugated diene compound into not less than 1 can be efficiently introduced the unconjugated olefin into the reaction mixture.

In the method for producing the copolymer according to the invention, the reaction mixture includes the polymerization catalyst composition, the solvent and so on in addition to the conjugated diene compound and the unconjugated olefin.

Also, in the copolymer of the conjugated diene compound and the unconjugated olefin other than the conjugated diene compound obtained by the method for producing the copolymer according to the invention, the number average molecular weight (Mn) of the copolymer is not particularly limited, and also a problem of molecular weight reduction is not caused. From the viewpoint of an application for macromolecular structure materials, the number average molecular weight (Mn) is preferably not less than 50,000, more preferably 100,000. Further, the molecular weight distribution (Mw/Mn) represented by a ratio of weight average molecular weight (Mw) to number average molecular weight (Mn) is preferably not more than 4, more preferably not more than 2.5. At this moment, the average molecular weight and the molecular weight distribution can be determined by a gel permeation chromatography (GPC) using polystyrene as a standard substance.

The copolymer of the conjugated diene compound and the unconjugated olefin other than the conjugated diene compound obtained by the method for producing the copolymer according to the invention is high in the cis-1,4 bond content of the conjugated diene compound portion. The cis-1,4 bond content of the conjugated diene compound portion is preferably not less than 85%. When the cis-1,4 bond content of the conjugated diene compound portion is not less than 85%, a high extension crystallinity and a low glass transition point (Tg) can be maintained, whereby the properties such as wear resistance and the like are improved. While when the cis-1,4 bond content of the conjugated diene compound portion is less than 85%, the extension crystallinity is deteriorated remarkably, but also the glass transition point (Tg) is raised, so that the durability such as wear resistance or the like may be deteriorated.

The copolymer of the conjugated diene compound and the unconjugated olefin other than the conjugated diene compound obtained by the method for producing the copolymer according to the invention is preferably not more than 20%, more preferably not more than 15% in the vinyl bond content of the conjugated diene compound portion. When the vinyl bond content of the conjugated diene compound portion exceeds 20%, cis-1,4 bond content is reduced and the effect of improving the wear resistance may not be obtained sufficiently.

In the copolymer of the conjugated diene compound and the unconjugated olefin other than the conjugated diene compound obtained by the method for producing the copolymer according to the invention, a content of the unconjugated olefin other than the conjugated diene compound is preferably a range of 3-98 mol %, more preferably a range of 10-50 mol %. When the content of the unconjugated olefin other than the conjugated diene compound is within the specified range, the merit of introducing the unconjugated olefin having the effect of improving the heat resistance into the main chain while homogenously behaving as an elastomer is retained. When the content of the unconjugated olefin other than the conjugated diene compound is less than 3 mol %, the merit of introducing the unconjugated olefin into the main chain may be lost, while when it exceeds 98 mol %, the merit of introducing the conjugated diene compound into the main chain (e.g. an ease of cross-linkage or the like) may be lost.

The copolymer of the conjugated diene compound and the unconjugated olefin other than the conjugated diene compound obtained by the method for producing the copolymer according to the invention is advantageous in the cross-linking while maintaining the crystallizability, so that it can be used in the elastomer products as a whole, more particularly tire members.

EXAMPLES

The following examples are given in illustration of the invention and are not intended as limitations thereof.

Example 1

Into a pressure glass reactor of 400 ml dried sufficiently is added 325 ml of a solution containing 13.58 g (0.25 mol) of 1,3-butadiene in toluene, and thereafter ethylene is introduced thereinto at 0.4 MPa for 30 minutes. After the introducing of ethylene, the weight of the polymerization reaction system gains 7.00 g, from which it is confirmed that 0.25 mol of ethylene is introduced into the polymerization reaction system. Thus, the ratio of ethylene concentration E to butadiene concentration Bd at the starting of the polymerization (E/Bd) is 1.00. On the other hand, into a glass vessel in a glove box under a nitrogen atmosphere are charged 18 µmol of bis(2-phenylindenyl)gadolinium bis(dimethylsilylamide) [(2-PhC$_9$H$_6$)$_2$GdN(SiHMe$_2$)$_2$]$_{3.6}$ mol of dimethylanilinium tetrakis(pentafluorophenyl)borate [Me$_2$NHPhB(C$_6$F$_5$)$_4$] and 0.90 mmol of diisobutyl aluminum hydride, and dissolved in 10 ml of toluene to form a catalyst solution. Then, the catalyst solution is removed from the glove box, and added to the monomer solution in an amount of 17.5 mol by gadolinium conversion and the polymerization is conducted at a room temperature for 180 minutes. After the polymerization, 1 ml of a solution of 5 mass % of 2,2'-methylene-bis(4-ethyl-6-t-butylphenol) (NS-5) in isopropanol is added to terminate the reaction, and further the resulting copolymer is separated with a large amount of methanol and dried under vacuum at 70° C. to obtain a copolymer A. The yield of the resulting copolymer A is 12.00 g.

Example 2

A polymerization is conducted in the same manner as in Example 1 except that ethylene is introduced thereinto at 0.8 MPa for 30 minutes and 12.5 g (0.45 mol) of ethylene is charged (E/Bd-1.80), whereby a copolymer B is obtained in a yield of 10.30 g.

Example 3

A polymerization is conducted in the same manner as in Example 1 except that the amount of diisobutyl aluminum hydride charged is changed to 1.35 mmol, whereby a copolymer C is obtained in a yield of 13.65 g.

Example 4

Into a pressure glass reactor of 200 ml dried sufficiently is added 20 ml of a solution containing 3.38 g (0.063 mol) of 1,3-butadiene in toluene, and thereafter 2.45 g (0.088 mol) of ethylene is introduced thereinto (E/Bd=1.40). On the other hand, into a glass vessel in a glove box under a nitrogen atmosphere are charged 5.5 μmol of bis(2-phenylindenyl) gadolinium bis(dimethylsilylamide) [(2-PhC$_9$H$_6$)$_2$GdN(SiHMe$_2$)$_2$], 11.0 μmol of dimethylanilinium tetrakis(pentafluorophenyl)borate [Me$_2$NHPhB(C$_6$F$_5$)$_4$] and 0.41 mmol of triisobutyl aluminum, and dissolved in 10 ml of toluene to form a catalyst solution. Then, the catalyst solution is removed from the glove box, and added to the monomer solution in an amount of 5.0 mol by gadolinium conversion and the polymerization is conducted at a room temperature for 240 minutes. After the polymerization, 1 ml of a solution of 5 mass % of 2,2'-methylene-bis(4-ethyl-6-t-butylphenol) (NS-5) in isopropanol is added to terminate the reaction, and further the resulting copolymer is separated with a large amount of methanol and dried under vacuum at 70° C. to obtain a copolymer D. The yield of the resulting copolymer D is 4.15 g.

Reference Example 1

Into a glass bottle of 1 L provided with a rubber plug and dried and replaced with nitrogen is charged 450 g of a solution containing 54 g (1 mol) of 1,3-butadiene in toluene to form a monomer solution. On the other hand, into a glass vessel in a glove box under a nitrogen atmosphere are charged 3 mol of bis(2-phenylindenyl)gadolinium bis(dimethylsilylamide) [(2-PhC$_9$H$_6$)$_2$GdN(SiHMe$_2$)$_2$], 4.5 mol of dimethylanilinium tetrakis(pentafluorophenyl)borate [Me$_2$NHPhB(C$_6$F$_5$)$_4$] and 1.5 mmol of diisobutyl aluminum hydride, and dissolved in 5 ml of toluene to form a catalyst solution. Then, the catalyst solution is removed from the glove box, and added to the monomer solution in an amount of 2 μmol by gadolinium conversion and the polymerization is conducted at a room temperature for 180 minutes. After the polymerization, 2 ml of a solution of 5 mass % of 2,2'-methylene-bis(4-ethyl-6-t-butylphenol) (NS-5) in isopropanol is added to terminate the reaction, and further the resulting copolymer is separated with a large amount of methanol and dried under vacuum at 70° C. to obtain a polybutadiene E in a yield of 54 g.

With respect to the thus produced copolymers of Examples 1-4 and the polymer of Reference Example 1, the microstructure, ethylene content, number average molecular weight (Mn), molecular weight distribution (Mw/Mn) and chain characterization in the copolymer are measured and evaluated according to the following methods.

(1) Microstructure

Figure 2:
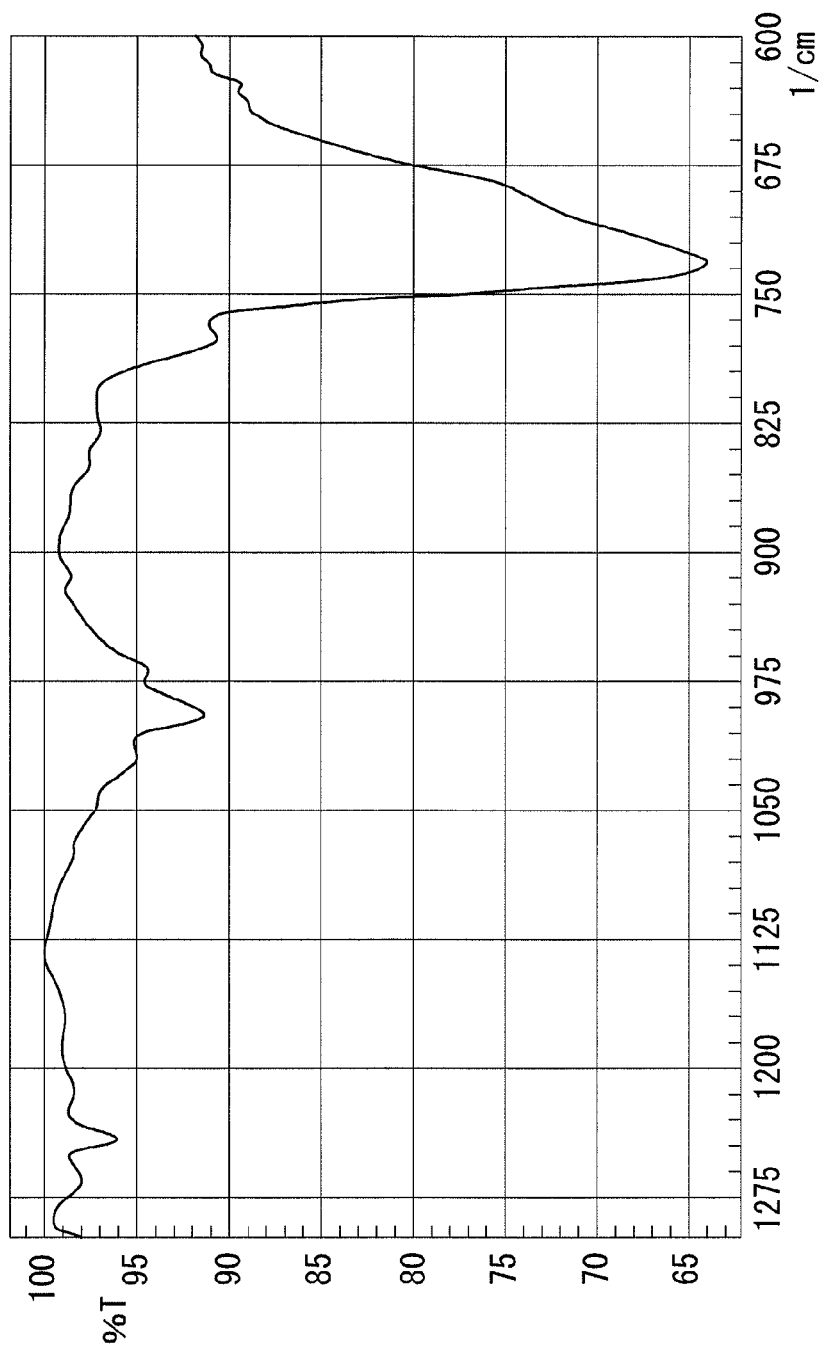
FIG. 2 is a chart of an IR spectrum of a polybutadinen E.

The microstructure is determined by an infrared method (Morello method). The results are shown in Table 1. FIG. 1 is a chart of the IR spectrum of butadiene-ethylene copolymer B. FIG. 2 is a chart of the IR spectrum of polybutadiene E.

(2) Ethylene Content

Figure 3:
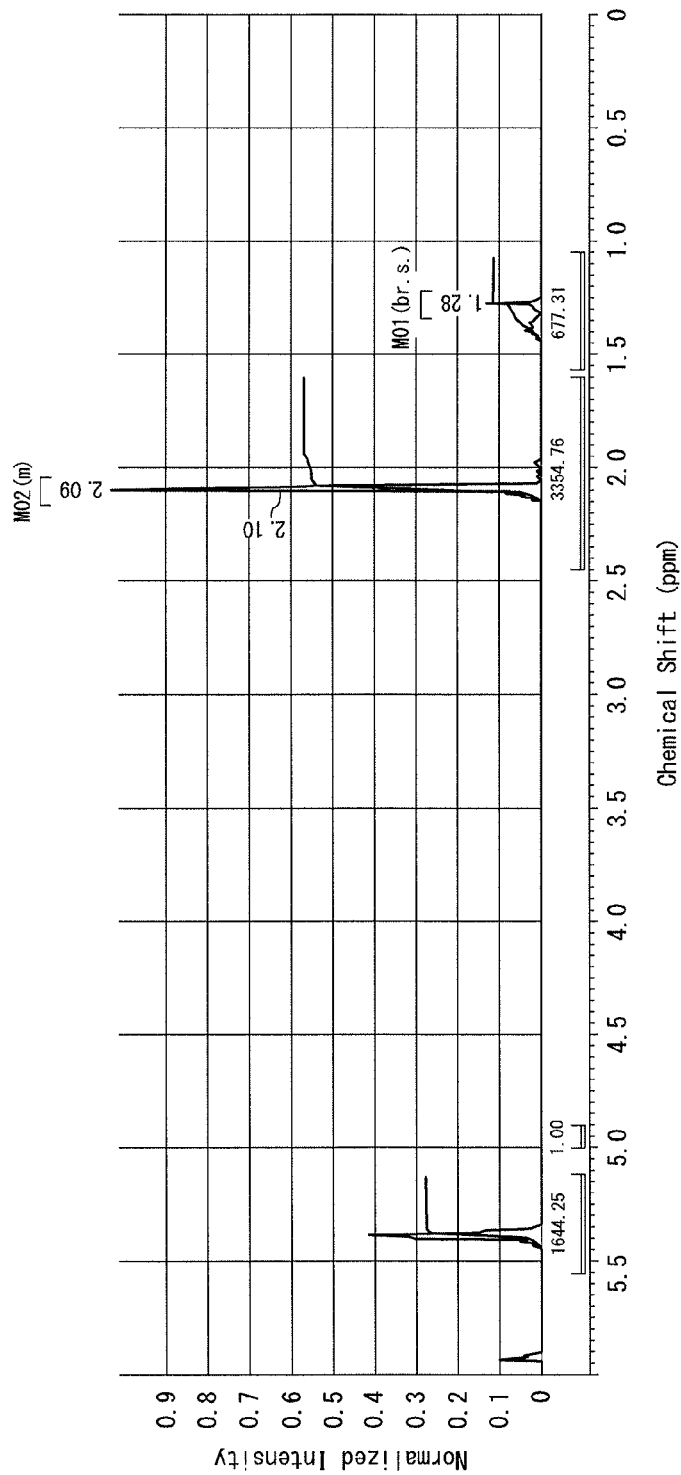
FIG. 3 is a chart of an $^1$H-NMR spectrum of a butadiene-ethylene copolymer B.

The content of ethylene portion in the copolymer (mol %) is determined by the integral ratio of $^1$H-NMR spectrum. Moreover, the measurement through $^1$H-NMR is conducted at 100° C. using a deuterated 1,1,2,2-tetrachloroethane as a solvent. The results are shown in Table 1. FIG. 3 is a chart of the $^1$H-NMR spectrum of butadiene-ethylene copolymer B.

(3) Chain Characterization in Copolymer

Figure 4:
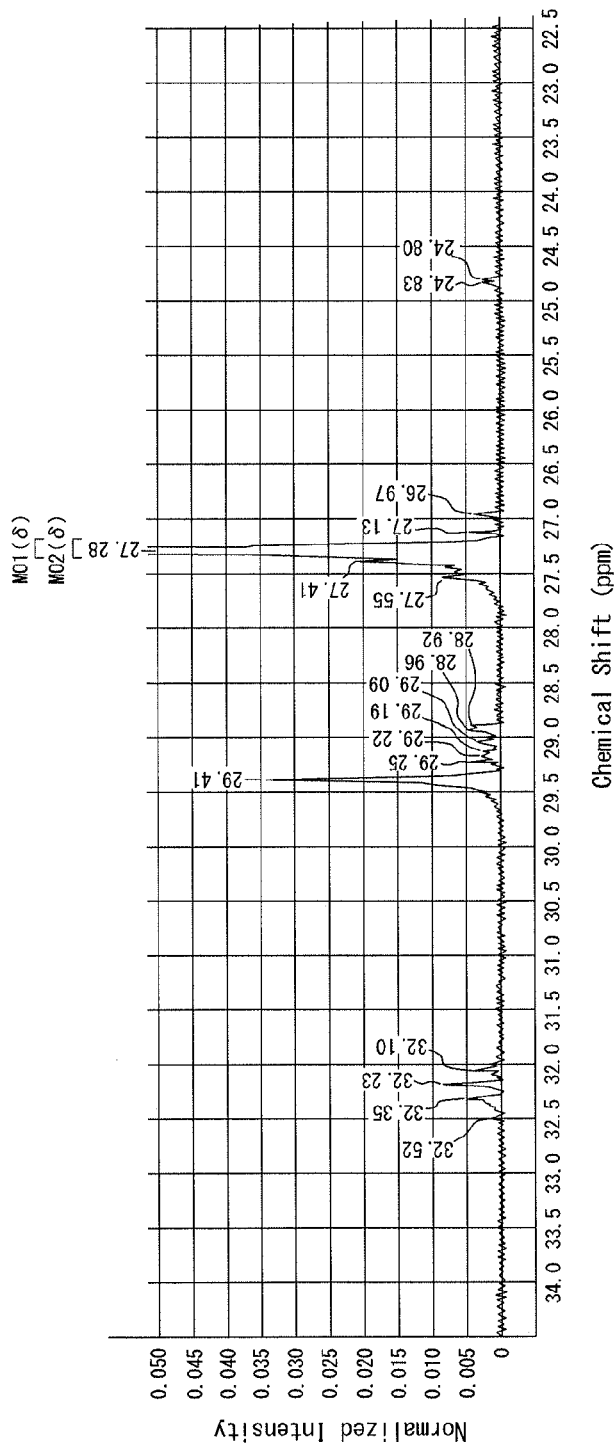
FIG. 4 is a chart of a $^{13}$C-NMR spectrum of a butadiene-ethylene copolymer B.

The chain characterization of the ethylene portion and butadiene portion in the copolymer is conducted by using $^{13}$C-NMR spectrum (methylene region of 22-36 ppm). Moreover, the measurement through $^{13}$C-NMR is conducted at 100° C. using a deuterated 1,1,2,2-tetrachloroethane as a solvent. FIG. 4 is a chart of the $^{13}$C-NMR spectrum of butadiene-ethylene copolymer B.

(4) Weight Average Molecular Weight (Mw) and Molecular Weight Distribution (Mw/Mn)

The weight average molecular weight (Mw) and the molecular weight distribution (Mw/Mn) of each polymer as converted to polystyrene are measured through a gel permeation chromatography [GPC: HLC-8121 GPC/HT made by TOSOH, column: GMH$_{HR}$–H(S)HT×two columns made by TOSOH, detector: differential refractometer (RI)] as a standard of monodisperse polystyrene. Moreover, the measurement temperature is 140° C.

TABLE 1

|  | Example 1 | Example 2 | Example 3 | Example 4 | Reference Example 1 |
|---|---|---|---|---|---|
| Mn (×10$^3$) | 174 | 158 | 100 | 134 | 316 |
| Mw/Mn | 1.94 | 1.94 | 2.45 | 2.42 | 1.58 |
| Cis-1,4 bond content (%) | 98.1 | 97.4 | 97.2 | 97.0 | 99.0 |
| Vinyl bond content (%) | 0.6 | 0.7 | 0.6 | 0.7 | 0.1 |
| Ethylene content (mol %) | 11 | 18 | 19 | 36 | — |

As seen from Table 1, all of polymers A-D of Examples 1-4 have a number average molecular weight (Mn) of not less than 100,000, and hence high-molecular weight copolymers are obtained. Also, it can be seen that the proportion of cis-1,4 bond content of the butadiene portion in each of these copolymers is high and shows the same degree of value even if they are compared with the result on the butadiene homopolymer shown in Reference Example 1. Further, the ethylene content in each of the copolymers is not less than 10 mol %, from which it is found that the proportion of the unconjugated olefin other than the conjugated diene compound in the copolymer can be controlled optionally. Still further, plural peaks other than a peak showing polyethylene (29.4 ppm) and a peak showing cis-1,4-polybutadiene (27.3 ppm) are observed by the chain characterization through $^{13}$C-NMR spectrum, from which it is found that ethylene and butadiene are copolymerized randomly.

The invention claimed is:

1. A method for producing a copolymer characterized by comprising a step of polymerizing a conjugated diene compound and an olefin in the presence of a polymerization catalyst composition comprising at least one complex selected from the group consisting of a metallocene complex represented by the following general formula (II):

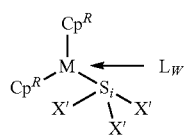
(II)

wherein M in the general formula (II) is a lanthanoid element, scandium or yttrium, and $Cp^R$ in the general formula (II) is independently a non-substituted or substituted indenyl, and X' in the general formula (II) is a hydrogen atom, a halogen atom, an alkoxide group, a thiolate group, an amide group, a silyl group or a hydrocarbon group having a carbon number of 1-20, and L in the general formula (II) is a neutral Lewis base, and w in the general formula (II) is an integer of 0-3, and a half-metallocene cation complex represented by the following general formula (III):

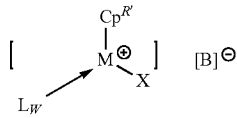
(III)

wherein M in the general formula (III) is a lanthanoid element, scandium or yttrium, and $Cp^{R'}$ in the general formula (III) is a non-substituted or substituted cyclopentadienyl, indenyl or fluorenyl, and X in the general formula (III) is a hydrogen atom, a halogen atom, an alkoxide group, a thiolate group, an amide group, a silyl group or a hydrocarbon group having a carbon number of 1-20, and L in the general formula (III) is a neutral Lewis base, and w in the general formula (III) is an integer of 0-3, and [B]$^-$ in the general formula (III) is a non-coordinating anion, and wherein the cis-1,4 bond content of the conjugated diene compound portion in the copolymer is not less than 85%, wherein when the conjugated diene compound is polymerized with the olefin, a concentration of the conjugated diene compound (mol/l) and a concentration of the olefin (mol/l) at the starting of the polymerization satisfy a relation of the following equation:

concentration of olefin/concentration of conjugated diene compound ≥ 1.3, and wherein a content of the olefin in the copolymer is a range of 10-50 mol %.

2. A method for producing a copolymer according to claim 1, wherein the polymerization of the conjugated diene compound and the olefin is an addition polymerization.

3. A method for producing a copolymer according to claim 1, wherein the olefin is an acyclic olefin.

4. A method for producing a copolymer according to claim 1, wherein the olefin is an α-olefin having a carbon number of 2-10.

5. A method for producing a copolymer according to claim 3, wherein the olefin is selected from the group consisting of ethylene and propylene.

6. A method for producing a copolymer according to claim 1, wherein the conjugated diene compound has a carbon number of 4-8.

7. A method for producing a copolymer according to claim 6, wherein the conjugated diene compound is selected from the group consisting of 1,3-butadiene and isoprene.

8. A method for producing a copolymer according to claim 4, wherein the olefin is selected from the group consisting of ethylene and propylene.

* * * * *